United States Patent
Greiner et al.

(10) Patent No.: US 8,014,924 B2
(45) Date of Patent: Sep. 6, 2011

(54) SYSTEMS AND METHODS FOR IMPROVING HAUL ROAD CONDITIONS

(75) Inventors: Jonny Ray Greiner, Dunlap, IL (US); Yang Liu, Dunlap, IL (US); Bhavin Jagdishbhal Vyas, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 998 days.

(21) Appl. No.: 11/974,240

(22) Filed: Oct. 12, 2007

(65) Prior Publication Data

US 2009/0099707 A1    Apr. 16, 2009

(51) Int. Cl.
G06F 7/70 (2006.01)
(52) U.S. Cl. .......................... 701/50; 701/80
(58) Field of Classification Search ............... 73/105; 701/80, 50, 1
See application file for complete search history.

(56) References Cited

U.S. PATENT DOCUMENTS

| | | | |
|---|---|---|---|
| 5,610,821 A | 3/1997 | Gazis et al. | |
| 5,719,771 A | 2/1998 | Buck et al. | |
| 5,817,936 A | 10/1998 | Schricker | |
| 6,246,932 B1 | 6/2001 | Kageyama et al. | |
| 6,611,755 B1 | 8/2003 | Coffee et al. | |
| 6,622,087 B2 | 9/2003 | Anderson | |
| 6,650,995 B2 | 11/2003 | Bullock | |
| 6,654,684 B2 | 11/2003 | Shinada et al. | |
| 6,754,615 B1* | 6/2004 | Germann et al. | 703/8 |
| 6,865,484 B2 | 3/2005 | Miyasaka et al. | |
| 6,950,740 B1 | 9/2005 | Cook | |
| 6,965,325 B2 | 11/2005 | Finnern | |
| 7,113,127 B1 | 9/2006 | Banet et al. | |
| 7,155,321 B2 | 12/2006 | Bromley et al. | |
| 2002/0010569 A1 | 1/2002 | Yamamoto | |
| 2002/0049523 A1 | 4/2002 | Diaz et al. | |
| 2003/0225923 A1 | 12/2003 | Cyr et al. | |
| 2004/0039520 A1 | 2/2004 | Khavakh et al. | |
| 2004/0122580 A1* | 6/2004 | Sorrells | 701/80 |
| 2005/0171692 A1 | 8/2005 | Hamblen et al. | |
| 2006/0036363 A1* | 2/2006 | Crook | 701/202 |
| 2006/0161335 A1 | 7/2006 | Beinhaker | |
| 2007/0016363 A1 | 1/2007 | Huang et al. | |
| 2007/0078579 A1 | 4/2007 | Schricker et al. | |

OTHER PUBLICATIONS

Coutermarsh, Barry, "Velocity effect of vehicle rolling resistance in sand", Journal of Terramechanics, Apr. 24, 2007, pp. 275-291, vol. 44, XP002512213, Hanover, NH.
Jonny Ray Greiner et al., Copending U.S. Appl. No. 11/897,651, filed Aug. 31, 2007.
Jonny Ray Greiner et al., Copending U.S. Appl. No. 11/897,736, filed Aug. 31, 2007.

(Continued)

*Primary Examiner* — Mark Hellner
(74) *Attorney, Agent, or Firm* — Finnegan, Henderson, Farabow, Garrett & Dunner LLP

(57) ABSTRACT

A method for improving haul road surface conditions comprises collecting performance data associated with at least one machine operating on a haul route and determining a rolling resistance of each of the at least one machine based on the performance data. An average rolling resistance associated with one or more portions of the haul route is determined based on the rolling resistance of each of the at least one machine. The one or more portions of the haul route are identified as irregular if the average rolling resistance of the one or more portions exceeds a threshold resistance value. A proposed modification to the irregular portion of the haul route is generated, and performance of the at least one machine is simulated based on the proposed modification. The method also includes outputting results of the simulated performance.

12 Claims, 4 Drawing Sheets

OTHER PUBLICATIONS

Jonny Ray Greiner et al., Copending U.S. Appl. No. 11/974,371, filed Oct. 12, 2007.

Jonny Ray Greiner et al., Copending U.S. Appl. No. 12/002,040, filed Dec. 14, 2007.

* cited by examiner

SYSTEMS AND METHODS FOR IMPROVING HAUL ROAD CONDITIONS

TECHNICAL FIELD

The present disclosure relates generally to the operations and management of haul routes and, more particularly, to systems and methods for improving haul road conditions.

BACKGROUND

In many work environments, particularly those that employ a fleet of machines that cooperate to perform a common task, productivity, efficiency, and profitability of the work environment may be dependent upon a variety of interrelated factors. For example, in mine environments that employ heavy equipment to excavate and transport materials from a mine site to a production facility, the productivity of the mine is directly dependent upon the health and productivity of each machine in the fleet. For certain types of machines, such as transport vehicles and haulers, machine productivity may also depend on work environment conditions (e.g., terrain conditions, weather conditions, etc.), as these conditions often affect speed, handling, and traction of the machines.

Early detection of structural defects in the haul road is imperative to the successful maintenance of haul road operations, as the weight of the machines and large volume of traffic associated with the haul road may cause even minor structural defects to degrade the haul road surface quite rapidly. In order to detect structural defects in the haul road, many conventional work environments implement haul road monitoring and maintenance programs. These haul road monitoring and maintenance programs involve rudimentary defect detection techniques, such as visual inspections, test-drive inspections, and as-needed emergency inspections (based, for example, on machine operator reports). In addition to being time consuming and inconvenient, these manual methods are often unreliable for detecting haul road deficiencies. For instance, visual inspection techniques may be susceptible to human error, as subsurface defects and other problems that may not be visible may go undetected. Test-drive inspections, while somewhat more reliable than visual inspections, are often not effective in simulating traffic and loading conditions that the haul route undergoes during normal operations, as these tests often prescribe shutting down the haul road during performance of the test. Emergency inspections based on machine operator reports typically only detect haul road deficiencies after they have manifested themselves, which is often too late for implementing preventative maintenance procedures. Thus, in order to effectively detect and correct haul road deficiencies in a timely manner, an automated system for identifying haul road deficiencies and determining corrective actions to resolve these deficiencies may be required.

One conventional method for efficiently identifying changes in haul road conditions without relying on time-intensive manual inspection techniques is described in U.S. Pat. No. 5,817,936 ("the '936 patent") to Schricker. The '936 patent describes a method for detecting a change in the condition of a road by sensing a plurality of parameters from one or more machines traveling along the road. The sensed parameters may be used to calculate a resistance factor for each of the one or more machines and determine an average resistance factor for the fleet of machines. If the average resistance factor exceeds a threshold level, a change (i.e., deficiency or fault) in the road segment may be identified and/or corrected.

Although some conventional methods, such as the method described in the '936 patent, may enable detection of changes in road conditions based on performance of a fleet of machines, they may be limited in certain situations. For example, while these conventional systems may be capable of detecting changes in haul road conditions, they may not be equipped to analyze prospective solutions that correct or otherwise address these changes in haul road conditions. As a result, mine operators and/or work environment managers may be required to make haul road repairs and/or modifications without a complete understanding of the impact of the repairs and/or modifications on the performance, budget, and/or long-term health of the haul route and/or one or more machines associated therewith.

Moreover, many conventional methods for detecting changes in haul road conditions, like the one described in the '936 patent, may not be integrated with performance modeling and simulation software that allows users to make modifications to certain machine or haul road parameters and test these modifications before implementation in the work environment. As a result, conventional systems may be limited to trial-and-error methods for haul road improvement, where haul road improvements are implemented and the impact of these improvements are determined in subsequent haul road operations. If required, adjustments may be made in order to incrementally improve haul route performance until a desired performance goal in achieved. Although these trial-and-error methods can be effective, they methods are often time consuming and costly, particularly if several iterations of the modification/test process are required. Thus, in order to effectively and reliably improve haul road conditions while controlling costs, a system and method for identifying problematic haul road conditions and testing one or more proposed haul road improvement options prior to implementation may be required.

The presently disclosed systems and methods for improving haul route conditions are directed toward overcoming one or more of the problems set forth above.

SUMMARY

In accordance with one aspect, the present disclosure is directed toward a method for improving haul road surface conditions. The method may comprise collecting performance data associated with at least one machine operating on a haul route and determining a rolling resistance of each of the at least one machine based on the performance data. An average rolling resistance may be determined based on the rolling resistance of each of the at least one machine. A portion of the haul route may be identified as irregular if the average rolling resistance of the at least one machine exceeds a threshold resistance value. A proposed modification to the irregular portion of the haul route may be generated, and a performance of the at least one machine may be simulated based on the proposed modification. The method may also include outputting results of the simulated performance of the at least one machine.

According to another aspect, the present disclosure is directed toward a method for improving haul road surface conditions. The method may comprise collecting performance data associated with at least one machine operating on a haul route and monitoring, based on the performance data, a number of gear changes of each of the at least one machine. An average number of gear changes may be determined based on the number of gear changes for each of the at least one machine. One or more portions of the haul route may be identified as irregular if the average number of gear changes exceeds a threshold limit. A proposed modification to one or more irregular portions of the haul route may be generated and performance of the at least one machine may be simulated based on the proposed modification. The results of the simulated performance may be output.

In accordance with yet another aspect, the present disclosure is directed toward a haul route management system. The system may include a condition monitoring system in data communication with a machine operating in a work environment and configured to collect performance data associated with at least one machine. The system may also include a torque estimator communicatively coupled to the condition monitoring system and configured to determine a rolling resistance of each of the at least one machine based on the performance data. The system may further include a performance simulator communicatively coupled to the torque estimator and the condition monitoring system. The performance simulator may be configured to determine an average rolling resistance based on the rolling resistance of each of the at least one machine. The performance simulator may also be configured to identify a portion of the haul route as irregular if the average rolling resistance of the at least one machine exceeds a threshold resistance value. The performance simulator may be further configured to receive a proposed modification to the irregular portion of the haul route, simulate a performance of the at least one machine based on the proposed modification, and output results of the simulated performance.

DETAILED DESCRIPTION

Figure 1:
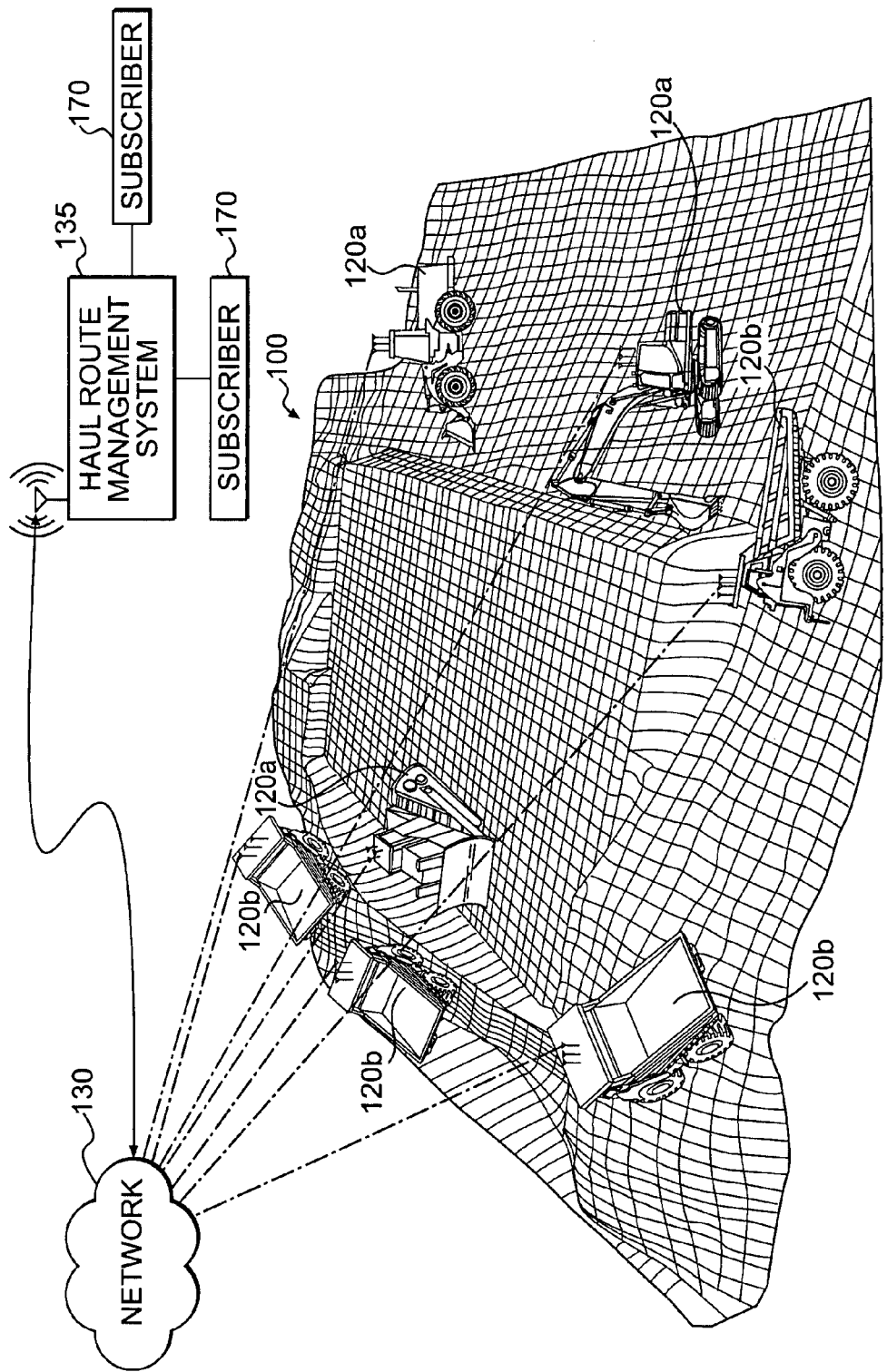
FIG. 1 illustrates an exemplary work environment consistent with the disclosed embodiments.

FIG. 1 illustrates an exemplary work environment 100 consistent with the disclosed embodiments. Work environment 100 may include systems and devices that cooperate to perform a commercial or industrial task, such as mining, construction, energy exploration and/or generation, manufacturing, transportation, agriculture, or any task associated with other types of industries. According to the exemplary embodiment illustrated in FIG. 1, work environment 100 may include a mining environment that comprises one or more machines 120a, 120b coupled to a haul route management system 135 via a communication network 130. Work environment 100 may be configured to monitor, collect, and filter information associated with the status, health, and performance of one or more machines 120a, 120b, and distribute the information to one or more back-end systems or entities, such as haul route management system 135 and/or subscribers 170. It is contemplated that additional and/or different components than those listed above may be included in work environment 100.

As illustrated in FIG. 1, machines 120a, 120b may include one or more excavators 120a and one or more transport machines 120b. Excavators 120a may embody any machine that is configured to remove material from the mine and load the material onto one or more transport machines 120b. Non-limiting examples of excavators 120a include, for example, bucket-type excavating machines, electromagnetic-lift devices, backhoe loaders, dozers, etc. Transport machines 120b may embody any machine that is configured to transport materials within work environment 100 such as, for example, articulated trucks, dump trucks, or any other truck adapted to transport materials. The number, sizes, and types of machines illustrated in FIG. 1 are exemplary only and not intended to be limiting. Accordingly, it is contemplated that work environment 100 may include additional, fewer, and/or different components than those listed above. For example, work environment 100 may include a skid-steer loader, a track-type tractor, material transfer vehicle, or any other suitable fixed or mobile machine that may contribute to the operation of work environment 100.

Figure 2:
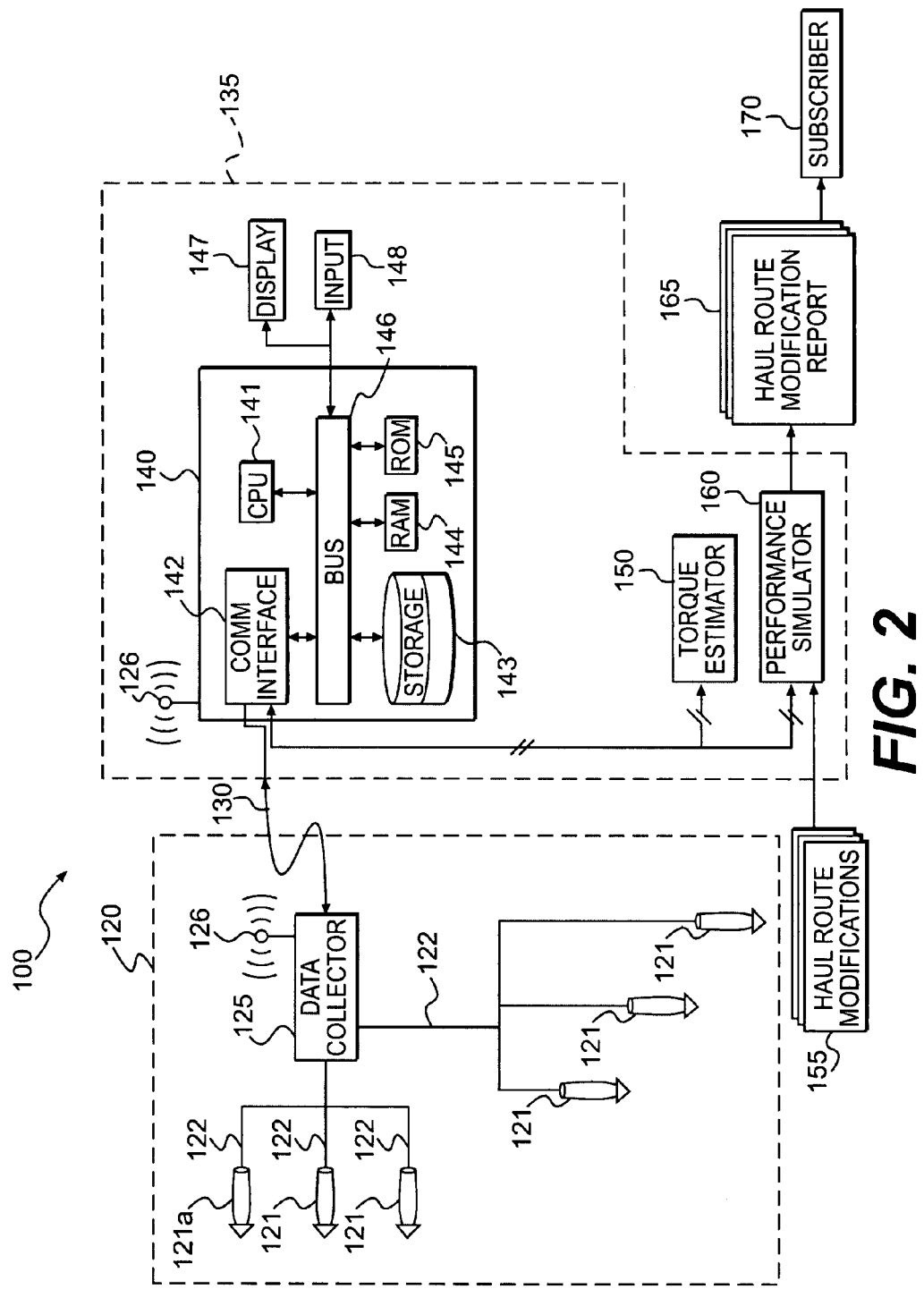
FIG. 2 provides a schematic diagram illustrating certain components associated with the work environment of FIG. 1.

In one embodiment, each of machines 120a, 120b may include on-board data collection and communication equipment to monitor, collect, and/or distribute information associated with one or more components of machines 120a, 120b. As shown in FIG. 2, machines 120a, 120b may each include, among other things, one or more monitoring devices 121, such as sensors or electronic control modules coupled to one or more data collectors 125 via communication lines 122; one or more transceiver devices 126; and/or any other components for monitoring, collecting, and communicating information associated with the operation of machines 120a, 120b. Each of machines 120a, 120b may also be configured to receive information, warning signals, operator instructions, or other messages or commands from off-board systems, such as a haul route management system 135. The components described above are exemplary and not intended to be limiting. Accordingly, the disclosed embodiments contemplate each of machines 120a, 120b including additional and/or different components than those listed above.

Monitoring devices 121 may include any device for collecting performance data associated with one or more machines 120a, 120b. For example, monitoring devices 121 may include one or more sensors for measuring an operational parameter such as engine and/or machine speed and/or location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; haul grade and traction data; drive axle torque; intervals between scheduled or performed maintenance and/or repair operations; and any other operational parameter of machines 120a, 120b.

In one embodiment, transport machines 120b may each include at least one torque sensor 121a for monitoring a torque applied to the drive axle. Alternatively, torque sensor 121a may be configured to monitor a parameter from which torque on the drive axle may be calculated or derived. It is contemplated that one or more monitoring devices 121 may be configured to monitor certain environmental features associated with work environment 100. For example, one or more machines 120a, 120b may include an inclinometer for measuring an actual grade associated with a surface upon which the machine is traveling. It is also contemplated that one or more monitoring devices 121 may be dedicated to the collection of machine location data. For example, machines 120a, 120b may each include GPS equipment for monitoring location data (e.g., latitude, longitude, elevation, etc.) associated with the machine.

Data collector 125 may be configured to receive, collect, package, and/or distribute performance data collected by monitoring devices 121. Performance data, as the term is used herein, refers to any type of data indicative of at least one operational aspect associated with one or more machines 120 or any of its constituent components or subsystems. Non-limiting examples of performance data may include, for example, health information such as fuel level, oil pressure, engine temperature, coolant flow rate, coolant temperature, tire pressure, or any other data indicative of the health of one or more components or subsystems of machines 120a, 120b. Alternatively and/or additionally, performance data may include status information such as engine power status (e.g., engine running, idle, off), engine hours, engine speed, machine groundspeed, machine location and elevation, current gear that the machine is operating in, or any other data indicative of a status of machine 120. Optionally, performance data may also include certain productivity information such as task progress information, load vs. capacity ratio, shift duration, haul statistics (weight, payload, etc.), fuel efficiency, or any other data indicative of a productivity of machine 120. Alternatively and/or additionally, performance data may include control signals for controlling one or more aspects or components of machines 120a, 120b. Data collector 125 may receive performance data from one or more monitoring devices via communication lines 122 during operations of the machine.

According to one embodiment, data collector 125 may automatically transmit the received data to haul route management system 135 via communication network 130. Alternatively or additionally, data collector 125 may store the received data in memory for a predetermined time period, for later transmission to haul route management system 135. For example, if a communication channel between the machine and haul route management system 135 becomes temporarily unavailable, the performance data may be retrieved for subsequent transmission when the communication channel has been restored.

Communication network 130 may include any network that provides two-way communication between machines 120a, 120b and an off-board system, such as haul route management system 135. For example, communication network 130 may communicatively couple machines 120a, 120b to haul route management system 135 across a wireless networking platform such as, for example, a satellite communication system. Alternatively and/or additionally, communication network 130 may include one or more broadband communication platforms appropriate for communicatively coupling one or more machines 120a, 120b to haul route management system 135 such as, for example, cellular, Bluetooth, microwave, point-to-point wireless, point-to-multipoint wireless, multipoint-to-multipoint wireless, or any other appropriate communication platform for networking a number of components. Although communication network 130 is illustrated as a satellite wireless communication network, it is contemplated that communication network 130 may include wireline networks such as, for example, Ethernet, fiber optic, waveguide, or any other type of wired communication network.

Haul route management system 135 may include one or more hardware components and/or software applications that cooperate to improve performance of a haul route by monitoring, analyzing, optimizing, and/or controlling performance or operation of one or more individual machines. Haul route management system 135 may include a condition monitoring system 140 for collecting, distributing, analyzing, and/or otherwise managing performance data collected from machines 120a, 120b. Haul route management system 135 may also include a torque estimator 150 for determining a drive axle torque, estimating a total effective grade, calculating a rolling resistance, and/or determining other appropriate characteristics that may be indicative of the performance of a machine or machine drive train. Haul route management system 135 may also include a performance simulator 160 for simulating performance-based models of machines operating within work environment 100 and adjusting operating parameters of machines 120a, 120b and/or physical features of the haul route to improve work environment productivity.

Condition monitoring system 140 may include any computing system configured to receive, analyze, transmit, and/or distribute performance data associated with machines 120a, 120b. Condition monitoring system 140 may be communicatively coupled to one or more machines 120 via communication network 130. Condition monitoring system 140 may embody a centralized server and/or database adapted to collect and disseminate performance data associated with each of machines 120a, 120b. Once collected, condition monitoring system 140 may categorize and/or filter the performance data according to data type, priority, etc. In the case of critical or high-priority data, condition monitoring system 140 may be configured to transmit "emergency" or "critical" messages to one or more work site personnel (e.g., repair technician, project managers, etc.) identifying machines that have experienced a critical event. For example, should a machine become disabled, enter an unauthorized work area, or experience a critical engine operation condition, condition monitoring system 140 may transmit a message (text message, email, page, etc.) to a project manager, job-site foreman, shift manager, machine operator, and/or repair technician, indicating a potential problem with the machine.

Condition monitoring system 140 may include hardware and/or software components that perform processes consistent with certain disclosed embodiments. For example, as illustrated in FIG. 2, condition monitoring system 140 may include one or more transceiver devices 126; a central processing unit (CPU) 141; a communication interface 142; one or more computer-readable memory devices, including storage device 143, a random access memory (RAM) module 144, and a read-only memory (ROM) module 145; a display unit 147; and/or an input device 148. The components described above are exemplary and not intended to be limiting. It is contemplated that condition monitoring system 140 may include alternative and/or additional components than those listed above.

CPU 141 may be one or more processors that execute instructions and process data to perform one or more processes consistent with certain disclosed embodiments. For instance, CPU 141 may execute software that enables condition monitoring system 140 to request and/or receive performance data from data collector 125 of machines 120a, 120b. CPU 141 may also execute software that stores collected performance data in storage device 143. In addition, CPU 141 may execute software that enables condition monitoring system 140 to analyze performance data collected from one or more machines 120a, 120b, perform diagnostic and/or prognostic analysis to identify potential problems with the machine, notify a machine operator or subscriber 170 of any potential problems, and/or provide customized operation analysis reports, including recommendations for improving machine performance.

CPU 141 may be connected to a common information bus 146 that may be configured to provide a communication medium between one or more components associated with condition monitoring system 140. For example, common information bus 146 may include one or more components for communicating information to a plurality of devices. CPU 141 may execute sequences of computer program instructions stored in computer-readable medium devices such as, for example, a storage device 143, RAM 144, and/or ROM 145 to perform methods consistent with certain disclosed embodiments, as will be described below.

Communication interface 142 may include one or more elements configured for two-way data communication between condition monitoring system 140 and remote systems (e.g., machines 120*a*, 120*b*) via transceiver device 126. For example, communication interface 142 may include one or more modulators, demodulators, multiplexers, demultiplexers, network communication devices, wireless devices, antennas, modems, or any other devices configured to support a two-way communication interface between condition monitoring system 140 and remote systems or components.

One or more computer-readable medium devices may include storage devices 143, a RAM 144, ROM 145, and/or any other magnetic, electronic, flash, or optical data computer-readable medium devices configured to store information, instructions, and/or program code used by CPU 141 of condition monitoring system 140. Storage devices 143 may include magnetic hard-drives, optical disc drives, floppy drives, flash drives, or any other such information storing device. A random access memory (RAM) device 144 may include any dynamic storage device for storing information and instructions by CPU 141. RAM 144 also may be used for storing temporary variables or other intermediate information during execution of instructions to be executed by CPU 141. During operation, some or all portions of an operating system (not shown) may be loaded into RAM 144. In addition, a read only memory (ROM) device 145 may include any static storage device for storing information and instructions by CPU 141.

Condition monitoring system 140 may be configured to analyze performance data associated with each of machines 120*a*, 120*b*. According to one embodiment, condition monitoring system 140 may include diagnostic software for analyzing performance data associated with one or more machines 120*a*, 120*b* based on threshold levels (which may be factory set, manufacturer recommended, and/or user configured) associated with a respective machine. For example, diagnostic software associated with condition monitoring system 140 may compare an engine temperature measurement received from a particular machine with a predetermined threshold engine temperature. If the measured engine temperature exceeds the threshold temperature, condition monitoring system 140 may generate an alarm and notify one or more of the machine operator, job-site manager, repair technician, dispatcher, or any other appropriate person or entity.

In accordance with another embodiment, condition monitoring system 140 may be configured to monitor and analyze productivity associated with one or more of machines 120*a*, 120*b*. For example, condition monitoring system 140 may include productivity software for analyzing performance data associated with one or more machines 120*a*, 120*b* based on user-defined productivity thresholds associated with a respective machine. Productivity software may be configured to monitor the productivity level associated with each of machines 120*a*, 120*b* and generate a productivity report for a project manager, a machine operator, a repair technician, or any other entity that may subscribe to operator or machine productivity data (e.g., a human resources department, an operator training and certification division, etc.) According to one exemplary embodiment, productivity software may compare a productivity level associated with a machine (e.g., amount of material moved by a particular machine) with a predetermined productivity quota established for the respective machine. If the productivity level is less than the predetermined quota, a productivity notification may be generated and provided to the machine operator and/or project manager, indicating the productivity deficiency of the machine.

Condition monitoring system 140 may be in data communication with one or more other back-end systems and may be configured to distribute certain performance data to these systems for further analysis. For example, condition monitoring system 140 may be communicatively coupled to a torque estimator 150 and may be configured to provide performance data associated with the machine drive axle to torque estimator 150. Alternatively or additionally, condition monitoring system 140 may be in data communication with a performance simulator 160 and may be configured to provide performance data to performance simulator 160 for further analysis. Although torque estimator 150 and performance simulator 160 are illustrated as standalone systems that are external to condition monitoring system 140, it is contemplated that one or both of torque estimator 150 and performance simulator 160 may be included as a subsystem of condition monitoring system 140.

Torque estimator 150 may include a hardware or software module configured to receive/collect certain performance data from condition monitoring system 140 and determine, based on the received operation data, a drive axle torque associated with one or more machines 120*a*, 120*b*. Torque estimator 150 may be configured to determine a drive axle torque based on performance data collected by torque sensor 121*a*. Alternatively or additionally, drive axle torque may be estimated based on the performance data and the known design parameters of the machine. For example, based on an engine operating speed and the operating gear, torque estimator 150 may access an electronic look-up table and estimate the drive axle torque of the machine at a particular payload weight using the look-up table.

Once an estimated machine drive axle torque is determined, torque estimator 150 may estimate a total effective grade for the one or more machines. For example, torque estimator 150 may estimate a total effective grade (TEG) value as:

$$TEG = \frac{RP}{GMW} - \frac{MA}{AG}$$

where RP refers to machine rimpull, GMW refers to gross machine weight, MA refers to the acceleration of the machine, and AG refers to the actual grade of the terrain on which that machine is located. Gross machine weight and machine acceleration may be monitored using on-board data monitoring devices 121. Actual grade may be estimated based on monitored GPS data associated with the machine. For example, actual grade may be determined using based on latitude, longitude, and elevation of the machine derived from precision GPS data gathered from on-board GPS equipment. According to one embodiment, actual grade may be determined by calculating ratio between the vertical change in position (based on the elevation data associated with the GPS data) and the horizontal change in position (based on the latitude and longitude data associated with the GPS data). Alternatively or additionally, actual grade may be calculated using an on-board data monitoring device such as, for example, an inclinometer. Rimpull may be determined as:

$$RP = \frac{DAT \times LPTR \times PTE}{TDRR}$$

where DAT refers to the torque applied to the machine drive axle, LPTR refers to the lower power train reduction factor, PTE refers to the efficiency of the power train, and TDRR refers to the dynamic rolling radius of the tire. Lower power train reduction may be determined by monitoring a change in gear during real-time calculation of rim pull. Power train efficiency may be calculated based on real-time performance data collected from the machine. Tire dynamic rolling radius may be estimated based on a monitored tire pressure, speed, and gross machine weight.

Once total effective grade has been determined, torque estimator 150 may determine a rolling resistance associated with one or more of machines 120a, 120b. A rolling resistance value may be calculated as:

$$RR = TEG - (AG + EL)$$

where EL refers to the efficiency loss of the machine. Efficiency loss may be estimated as the difference between input power efficiency and output power efficiency, which may be estimated based on empirical test data at particular engine operating speeds and loading conditions. As explained, actual grade may be determined based on calculations associated with collected GPA data and/or monitored using an on-board inclinometer.

Performance simulator 160 may be configured to simulate performance of machines 120a, 120b under various operational or environmental conditions. Based on the simulation results, performance simulator 160 may determine one or more operating conditions to achieve a desired performance of machines 120a, 120b and/or work environment 100.

Performance simulator 160 may be any type of computing system that includes component or machine simulating software. The simulating software may be configured to build an analytical model corresponding to a machine or any of its constituent components based on empirical data collected from real-time operations of the machine. Once the model is built, performance simulator 160 may analyze the model under specific operating conditions (e.g., load conditions, environmental conditions, terrain conditions, haul route design conditions, etc.) and generate simulated performance data of the machine based on the specified conditions.

According to one embodiment, performance simulator 160 may include ideal design models associated with each of machines 120a, 120b. These ideal models can be electronically simulated to generate ideal performance data (i.e., data based on the performance of the machine as designed (under ideal operating conditions)). Those skilled in the art will recognize that, as a machine ages, components associated with the machine may begin to exhibit non-ideal behavior, due to normal wear, stress, and/or damage to the machine during operation. In order to provide more realistic performance simulations consistent with these non-idealities, the ideal models may be edited based on actual performance data collected from machines 120a, 120b, thus creating actual or empirical models of a respective machine and/or its individual components.

Performance simulator 160 may simulate the actual models to predict performance and productivity of the machine under a variety of operating conditions. For example, performance simulator 160 may simulate an actual model of hauler 120b under a machine operating and/or haul route surface conditions to determine a speed, torque output, engine condition, fuel consumption rate, greenhouse gas emission level, haul route completion time, etc. associated with each simulated condition. In one embodiment, performance simulator 160 may be configured to simulate the actual model of hauler 120b under a variety of physical conditions (e.g., grade levels, friction levels, smoothness, density, hardness, moisture content, etc.) associated with the haul route surface to determine how changes or improvements to the haul route design impact the performance of hauler 120b.

According to one exemplary embodiment, one or more of condition monitoring system 140 and/or performance simulator 160 may be configured to monitor trends in performance data associated with portions of the haul route. For example, performance simulator 160 may be configured to monitor real-time total effective grade associated with one or more machines operating on a haul route. Using precision GPS data, performance simulator 160 may associate the real-time total effective grade data with a particular position of the machine when the total effective grade data was collected. Performance simulator 160 may be configured to identify trends in the monitored total effective grade data and correlate these trends with a particular portion of the haul route in order to identify potential problems with the haul route that may unnecessarily limit the performance of one or more machines.

According to another exemplary embodiment, performance simulator 160 may be configured to detect performance deficiencies associated with one or more machines 120a, 120b due to haul road conditions by determining when machines 120a, 120b perform an excessive number of gear changes during haul route operations. Performance simulator 160 may be configured to monitor and record the number of gear changes (e.g., downshifts, upshifts, etc.) associated with one more machines 120a, 120b corresponding with particular portions of the haul route. Performance simulator 160 may be configured to calculate an average number of gear changes associated with one or more haul route segments. Performance simulator 160 may identify segments of the haul route having an average number of gear changes that exceeds a threshold acceptable level for further performance simulation and/or analysis.

According to yet another embodiment, performance simulator 160 and/or condition monitoring system 140 may be configured to detect irregularities in a portion of the haul road based on differences in actual grade data associated with machines 120a, 120b. For example, performance simulator may be configured to monitor real-time actual grade data associated with each machine, based on GPS data collected from machines 120a, 120b. Performance simulator 160 may be configured to determine the average actual grade for each segment of the haul road and monitor trends in the average actual grade. Performance simulator 160 may be configured to detect changes in the trends of the actual grade data and monitor changes to identify potential problems with the haul road. For instance, if the average actual grade of a particular segment of the haul road is exhibiting a decreasing trend, performance simulator 160 may associate this decrease with excessive haul road wear, and order an inspection of the segment in order to identify a cause of the decrease.

In addition to identifying particular haul route segments that may cause performance problems associated with one or more machines, performance simulator 160 may be configured to simulate machine models in order to determine one or more solutions for correcting deficiencies associated with the particular haul route segments. For example, if the average total effective grade of machines traveling over a haul route segment exceeds a threshold level, performance simulator 160 may simulate performance of one or more machines or machine types using modified haul route parameters. According to one embodiment, performance simulator 160 may adjust, for example, a surface parameter associated with the segment (e.g., grade, density, friction, etc.) and simulate performance of the machine at the adjusted surface parameter.

Performance simulator 160 may also include a diagnostic and/or prognostic simulation tool that simulates actual machine models (i.e., models derived or created from actual machine data) to predict a component failure and/or estimate the remaining lifespan of a particular component or subsystem of the machine. For example, based on performance data associated with the engine and/or transmission, performance simulator 160 may predict the remaining lifespan of the engine, drive train, differential, or other components or subsystems of the machine. Accordingly, performance simulator 160 may predict how changes in one or more haul road parameters may affect the lifespan of one or more of these components. For instance, performance simulator 160 may estimate that, if the grade of a particular haul road segment is reduced by 1.5%, thereby reducing the strain on the engine, transmission, and/or drive train, the remaining lifespan of the drive train may increase by 15%. Performance simulator 160 may periodically report this data to a mine operator, project manager, machine operator, and/or maintenance department of work environment 100.

Performance simulator 160 may be configured to output results of the performance simulation(s). For example, performance simulator 160 may output simulated performance data via display 147 of condition monitoring system 140. Alternatively and/or additionally, performance simulator 160 may generate a haul road modification report 165 associated with work environment 100. Haul route modification report 165 may include performance simulation results corresponding to proposed modifications to machine operating parameters and/or haul route adjustment parameters. Alternatively or additionally, haul route modification reports 165 may include paper-based or electronic reports that list one or more haul route segments associated with unacceptable machine performance and/or recommended modifications to the one or more haul route segments that may improve machine performance associated with these segments.

Performance simulator 160 may be configured to distribute haul route modification report(s) 165 to one or more subscribers 170 of haul route modification data. Subscribers 170 may include, for example, project managers, mine owners, repair technicians, shift managers, human resource personnel, or any other person or entity that may be designated to receive haul route modification reports 165.

It is contemplated that one or more of condition monitoring system 140, torque estimator 150, and/or performance simulator 160 may be included as a single, integrated software package or hardware system. Alternatively or additionally, these systems may embody separate standalone modules configured to interact or cooperate to facilitate operation of one or more of the other systems. For example, while torque estimator 150 is illustrated and described as a standalone system, separate from performance simulator 160, it is contemplated that torque estimator 150 may be included as a software module configured to operate on the same computer system as performance simulator 160.

Figure 3:
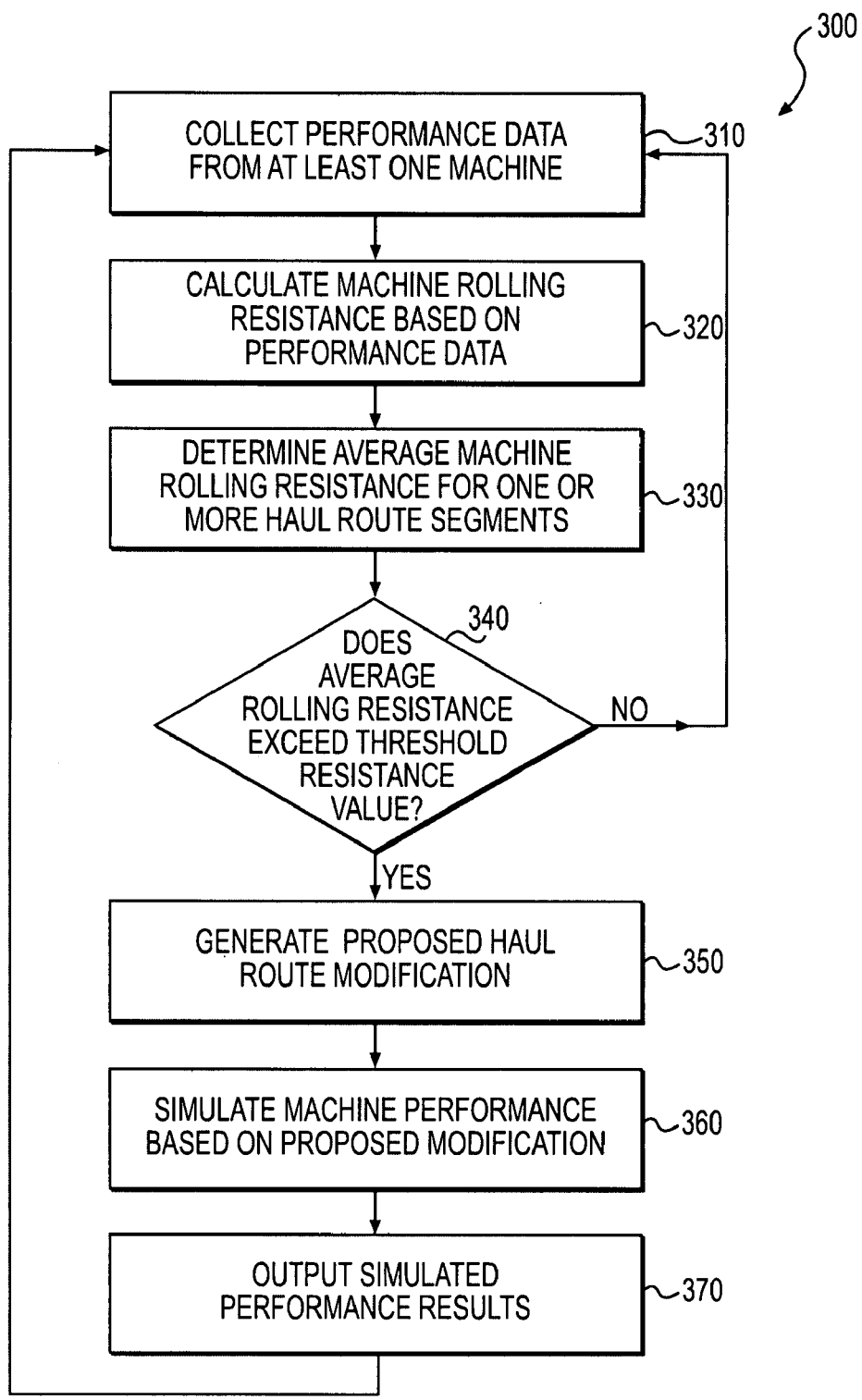
FIG. 3 provides a flowchart depicting one exemplary method for improving haul road surface conditions, consistent with certain disclosed embodiments.
Figure 4:
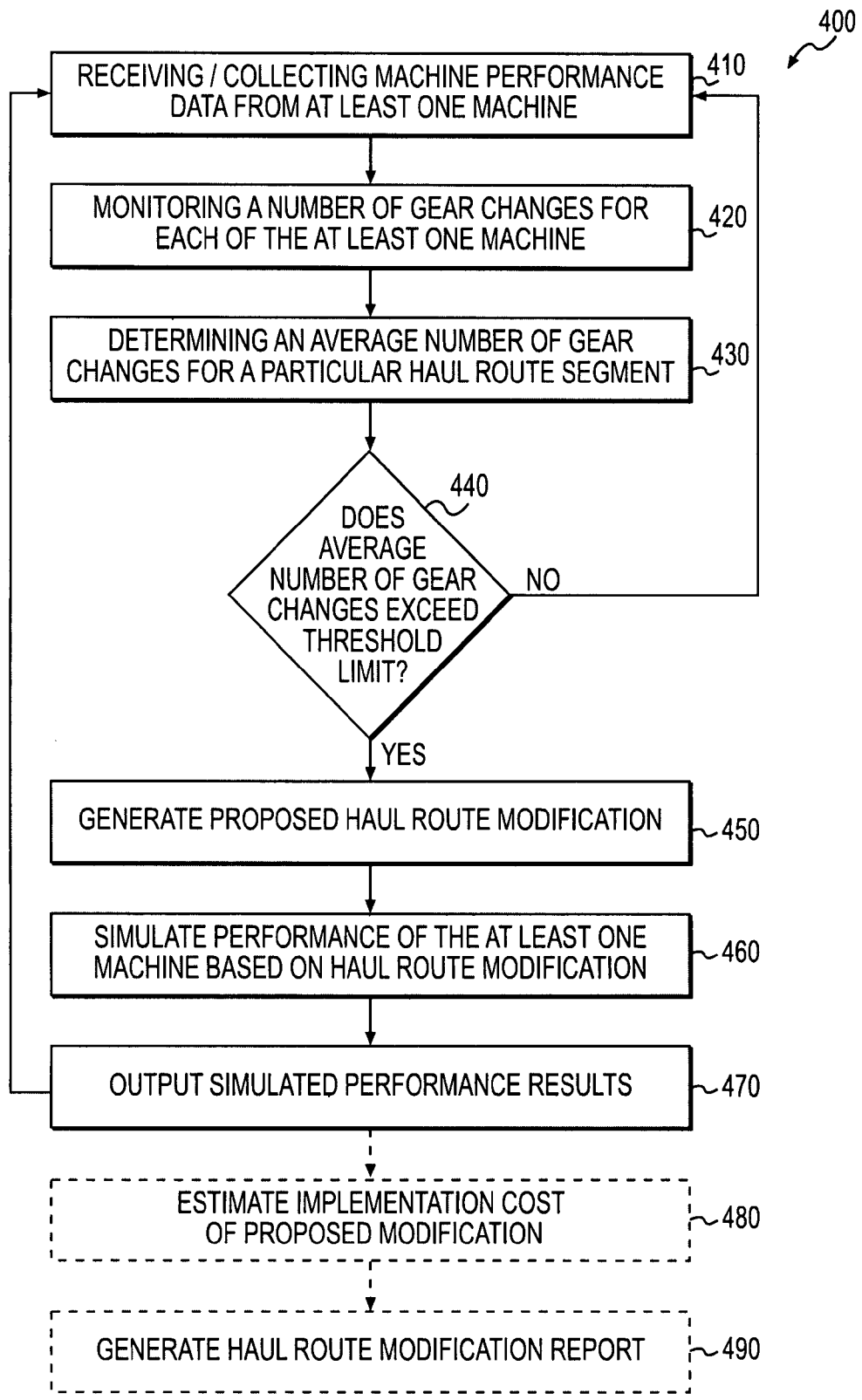
FIG. 4 provides a flowchart depicting another exemplary method for improving haul road surface conditions, consistent with certain disclosed embodiments.

Processes and methods consistent with the disclosed embodiments may provide a solution for identifying haul road surface deficiencies based on monitored performance data associated with one or more machines operating on the haul route. Specifically, the features and methods described herein allow project managers, equipment owners, and/or mine operators to identify segments of a haul route that may cause a plurality of machines to operate inefficiently. Additionally, processes and features consistent with the disclosed embodiments may provide recommendations for adjusting and/or modifying haul road parameters associated with underperforming segments of the haul route, simulating performance of the machine based on the recommendations, and providing the simulated performance results to a subscriber. FIGS. 3 and 4 provide flowcharts 300 and 400, respectively, which illustrate exemplary methods for improving haul road surface conditions in work environments based on machine performance data.

As illustrated in FIG. 3, performance data may be collected from at least one machine operating on the haul route (Step 310). For example, condition monitoring system 140 of haul route management system 135 may receive/collect performance data from each machine operating in work environment 100. According to one embodiment, condition monitoring system 140 may automatically receive this data from data collectors 125 associated with each of machines 120a, 120b. Alternatively or additionally, condition monitoring system 140 may provide a data request to each of machines 120a, 120b and receive performance data from each machine in response to the request.

Once performance data has been collected, a rolling resistance associated with each of the at least one machine may be determined/calculated based on the performance data associated with a respective machine (Step 320). For example, torque estimator 150 may determine the drive axle torque based on data received from torque sensor 121a. Alternatively, torque estimator 150 may determine drive axle torque using electronic look-up tables (compiled from empirical test data associated with the type and model of machine) based on engine operating conditions, gear selection, and other data received from the machine. Once drive axle torque has been determined/estimated, torque estimator 150 may calculate/estimate a total effective grade associated with each machine. Torque estimator 150 may determine a machine rolling resistance based on the total effective grade, actual grade of the haul route, and efficiency loss of the machine.

According to one embodiment, rolling resistance values may be continuously determined/calculated during machine operations on the haul route. For example, as condition monitoring system 140 continuously collects performance data from one or more machines, torque estimator 150 may calculate rolling resistance values corresponding with each set of collected performance data. Each rolling resistance value may be tagged with a timestamp and location information (e.g., GPS data) corresponding to the time and location of the machine when the performance data set was collected. By associating rolling resistance values with position data, performance simulator 160 can monitor trends in rolling resistance values and correlate these trends with a particular haul route segment.

Based on rolling resistance values associated with the individual machines, an average machine rolling resistance for one or more haul route segments may be determined (Step 330). For example, performance simulator 160 may average previously stored rolling resistance data associated with a haul route segment with current rolling resistance data for the segment.

Performance simulator 160 may compare the average rolling resistance associated with a haul route segment with a threshold resistance value for the segment (Step 340). If the average rolling resistance does not exceed a threshold resistance value (Step 340: No), indicating that the particular haul route segment is operating normally, the process may proceed back to Step 310 to continue monitoring performance data. The threshold resistance value may be defined by a haul route manager based on desired performance of machines 120a, 120b. Alternatively, the threshold resistance value may be determined based on manufacturer recommended operating parameters for each of machines 120a, 120b, in order to prolong component life. For example, a manufacturer may specify particular operating parameters (e.g., temperature, fluid level, engine operating speeds and levels, etc.) that must be met in order to maintain the warranty of the machine. Based on the manufacturer's guidelines, threshold resistance values that keep the machine operating within the recommended performance guidelines may be established. Accordingly, individual machines having actual resistance values that exceed the threshold resistance value may be flagged for maintenance to diagnose a cause of the machine performance.

If on the other hand, the average rolling resistance exceeds the threshold resistance value (Step 340: Yes), indicating a potential problem with the haul route and/or a majority of machines operating therein, a proposed haul route modification may be generated (Step 350). According to one embodiment, a user (e.g., subscriber) may create proposed modifications to the haul route and provide these modifications to performance simulator 160 via input device 148. Alternatively or additionally, performance simulator 160 may be configured to automatically generate proposed modifications to the haul route. For example, performance simulator 160 may be configured to generate, depending upon how much the average rolling resistance for a particular haul route segment exceeds the threshold level, a recommended reduction to the grade of the haul route segment to reduce the average rolling resistance of the segment.

Proposed haul route modifications may include any suitable modification to the haul road surface. For example, haul road modifications may include changes or repairs to the grade of the haul road surface; changes to the haul route density or surface friction by the addition or removal of certain materials (e.g., concrete, gravel, asphalt, etc.); repairs to potholes, cracks, or other deformities to the haul route surface; changes to the haul route length or design speed, or any other modification to the haul route surface that may improve machine performance over the haul route.

Once haul route modifications have been generated, performance-based models associated with one or more machines may be simulated with respect to the proposed modifications (Step 360). As explained, performance-based models associated with a machine may be created based on actual performance data collected from the machine. Performance simulator 160 may simulate the performance-based model using the proposed haul route modifications. By electronically simulating and analyzing the proposed modifications prior to making any actual changes, subscribers 170 and/or project managers may be provided with predictions of the potential impact of the proposed modifications on machine and/or haul route performance.

Once machine performance corresponding to proposed modifications to the haul route has been simulated, performance simulator 160 may output the simulation results (Step 370). For example, performance simulator 160 may output the simulation results on display 147 of haul route management system 135. Alternatively or additionally, performance simulator 160 may generate a haul route modification report 165, identifying one or more problematic haul road segments. Haul route modification report 165 may include rolling resistance and/or other performance statistics (e.g., fuel consumption, greenhouse gas emission level, drive train expected lifespan, etc.) corresponding with the problematic segments. Haul route modification report 165 may also include one or more recommendations for improving performance of one or more machines and/or work environment 100, as well as simulated performance data corresponding with the recommendations.

It is contemplated that additional and/or different machine operating parameters may be used to identify irregular or deficient haul road conditions. For example, in addition to monitoring trends in rolling resistance to identify potential problems associated with haul road segments, performance simulator 160 may identify irregular haul road surface conditions by identifying transmission shift patterns associated with each of machines 120a, 120b. Because each type of machine is designed to be most efficient at moderate engine and transmission operating zones, it may be advantageous to ensure that the haul route conditions are conducive for allowing machines to operate at these efficient operating levels. Thus, if a particular machine is most efficient operating at 1750 RPMs in second gear, haul road conditions causing the machine to perform an excessive number of gear shift may reduce machine efficiency and/or productivity. FIG. 4 provides a flowchart 400 depicting an exemplary method for improving haul road surface conditions based on the number of gear shifts performed by machines operating on the haul route.

As illustrated in FIG. 4, condition monitoring system 140 may receive/collect machine performance data from at least one machine (Step 410). For example, condition monitoring system 140 of haul route management system 135 may receive/collect performance data from each machine operating in work environment 100. According to one embodiment, condition monitoring system 140 may automatically receive this data from data collectors 125 associated with each of machines 120a, 120b. Alternatively or additionally, condition monitoring system 140 may provide a data request to each of machines 120a, 120b and receive performance data from each machine in response to the request.

Based on the performance data, condition monitoring system 140 may determine the number of gear changes associated with each of the at least one machine and record the number, time, and location of each gear change in memory (Step 420). For example, condition monitoring system 140 may count the number of gear changes for each of machines 120a, 120b based on transmission and/or engine data received from machines 120a, 120b. For each gear change, condition monitoring system may record the time that the gear change occurred, as well as GPS data (e.g., location and elevation data) corresponding with the gear change. By monitoring the location of each gear change, performance simulator 160 may be able to determine the number of gear changes that occurred over a particular haul route segment.

Performance simulator 160 may determine an average number of gear changes associated with a particular haul route segment based on the gear change data associated with one or more machines 120a, 120b (Step 430). Performance simulator 160 may compare the average number of gear changes associated with a particular haul route segment with a threshold limit (Step 440). The threshold limit corresponding with the average number of gear changes may be established based on test data gathered by operating a healthy machine on the haul route under normal payload and operating conditions. In some cases, a buffer may be added to the number of gear changes monitored on the test run to take into account for driver shift error, payload variations, etc. Thus, if the test data indicates that 4 gear changes should occur for a particular haul route segment, the threshold gear change limit may be established as 5 gear changes (i.e., the 4 gear changes from the test data, plus 1 buffer gear change to account for operator or machine shift error.)

If the average number of gear changes does not exceed a threshold limit (Step 440: No), indicating that the machines are not experiencing excessive gear shift due to haul road conditions, the process may proceed to Step 410 to continue monitoring performance of machines 120a, 120b. If, on the other hand, the average number of gear changes exceeds a threshold limit, a proposed haul route modification may be generated (Step 450). According to one embodiment, a user (e.g., subscriber) may create proposed modifications to the haul route and provide these modifications to performance simulator 160 via input device 148. Alternatively or additionally, performance simulator 160 may be configured to automatically generate proposed modifications to the haul route. For example, performance simulator 160 may be configured to generate a recommended change to the grade of the haul route segment to reduce the average number of gear changes of machines operating on the segment. As explained above with respect to FIG. 3, proposed haul route modifications may include modifications any suitable modification to the haul road surface.

Once haul route modifications have been generated, performance-based models associated with one or more machines may be simulated with respect to the proposed modifications (Step 460). As explained, performance-based models associated with a machine may be created based on actual performance data collected from the machine. Performance simulator 160 may simulate the performance-based model using the proposed haul route modifications. By electronically simulating and analyzing the proposed modifications prior to making any actual changes, subscribers 170 and/or project managers may be provided with predictions of the potential impact of the proposed modifications on machine and/or haul route performance.

Once machine performance corresponding to proposed modifications to the haul route has been simulated, performance simulator 160 may output the simulation results (Step 470). For example, performance simulator 160 may output the simulation results on display 147 of haul route management system 135. Alternatively or additionally, performance simulator 160 may generate a haul route modification report 165, identifying one or more problematic haul road segments. Haul route modification report 165 may include rolling resistance and/or other performance statistics (e.g., fuel consumption, greenhouse gas emission level, drive train expected lifespan, etc.) corresponding with the problematic segments. Haul route modification report 165 may also include one or more recommendations for improving performance of one or more machines and/or work environment 100, as well as simulated performance data corresponding with the recommendations.

According to one embodiment, an estimate of the implementation cost associated with the proposed modification(s) may be compiled (Step 480). This estimate may be based on the scope and magnitude of the proposed recommendations, as well as historical cost data associated with similar haul route improvement projects. This cost estimate may be provided to performance simulator 160, which may update/generate a haul route modification report 165 that includes cost estimate data associated with the proposed modification(s).

Once machine performance corresponding to proposed modifications to the haul route has been simulated and costs associated with the implementation of the proposed modifications have been estimated, performance simulator 160 may output the simulation results (Step 490). As noted above, haul route modification report 165 may include gear change and/or other performance statistics (e.g., rolling resistance, fuel consumption, greenhouse gas emission level, drive train expected lifespan, etc.) corresponding with the problematic segment(s). Haul route modification report 165 may also include one or more recommendations for improving performance of one or more machines and/or work environment 100, as well as simulated performance data corresponding with the recommendations and cost estimates associated with implementation of the recommendations.

Although the systems and methods associated with the disclosed embodiments have been described primarily in connection with haul roads for mine and construction environments, it is contemplated that the systems and methods described herein may be applicable to any roadway surface. For example, the systems and methods described herein may be employed on conventional interstate highways and other paved surfaces to identify changes and irregularities that may be associated with premature wear, which may result in decreased performance of machines or vehicles operated on these surfaces.

By way of example, the systems and methods described above may be employed during the construction of a paved highway. During grading and placement of one or more layers of a new road, one or more "test runs" of vehicles equipped with haul road management system 135 may be operated on the haul road to identify any irregularities in the roadway surface. By detecting irregularities early in the construction phase, these irregularities may be corrected in order to minimize or eliminate the effects that these types of irregularities have on the performance of machines to be operated on the haul road.

INDUSTRIAL APPLICABILITY

Methods and systems associated with the disclosed embodiments provide a solution for identifying problems associated with the haul road conditions based on machine performance data collected during real-time operations of the machine on the haul road. The systems and methods described herein may also allow users to test proposed haul road modifications by simulating performance-based machine models to determine the effectiveness of the proposed modification on the performance of the machine(s). Work environments that employ the processes and features described herein may provide a system that enables subscribers to effectively identify irregular haul road segments and simulate performance of one or more machines based on proposed modifications to the irregular segments. As a result, subscribers may select from a plurality of haul road modification options, based on the desired performance, productivity, and cost goals of the haul route.

Although the disclosed embodiments are described in relation to improving haul road conditions in mine environments, they may be applicable to any environment where it may be advantageous to automatically detect haul road deficiencies based on machine performance data and analyze potential haul road improvement options for correcting these deficiencies. According to one embodiment, the presently disclosed system and method for improving haul road conditions may be implemented as part of a connected worksite environment that monitors performance data associated with a machine fleet and diagnoses potential problems with machines in the fleet. As a result, systems and methods described herein may provide an integrated solution for monitoring both machine and haul road health and productivity, in a single integrated system.

The presently disclosed system and method for improving haul road conditions may have several advantages. For example, the systems and methods described herein may provide a solution for identifying haul road deficiencies, propose options for remedying these deficiencies, and analyze each of the proposed options to identify the costs and benefits that each option has on the performance, health, and productivity of the machines and/or the haul road. As a result, mine operators and work environment managers may be better equipped to quickly and objectively determine which haul road improvement option is consistent with the long-term productivity, health, budgetary, and performance goals of the haul road.

In addition, the presently disclosed haul road improvement system may have significant cost advantages. For example, by simulating one or more proposed options for remedying haul road deficiencies, the presently disclosed system enables users to incrementally test certain haul road improving options before any actual improvement costs are expended. As a result, costs and productivity losses due to trail-and-error haul road improvement methods may be reduced.

It will be apparent to those skilled in the art that various modifications and variations can be made to the disclosed system and methods for improving haul road conditions without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A haul route management system, comprising:
   a condition monitoring system in data communication with a machine operating in a work environment and configured to collect performance data associated with at least one machine;
   a torque estimator communicatively coupled to the condition monitoring system and configured to determine a rolling resistance of each of the at least one machine based on the performance data;
   a performance simulator communicatively coupled to the torque estimator and the condition monitoring system, wherein the performance simulator is configured to:
   determine an average rolling resistance based on the rolling resistance of each of the at least one machine;
   identify a portion of the haul route as irregular if the average rolling resistance of the at least one machine exceeds a threshold resistance value;
   receive a proposed modification to the irregular portion of the haul route;
   simulate a performance of the at least one machine based on the proposed modification; and
   output results of the simulated performance.

2. The system of claim 1, wherein the condition monitoring system is wirelessly coupled to an on-board data collector of the machine and configured to receive performance data from the on-board data collector during operations of the machine.

3. The system of claim 1, wherein the performance simulator includes the torque estimator.

4. The system of claim 1, wherein performance data includes drive axle torque and GPS data associated with the at least one machine.

5. The system of claim 4, wherein determining the rolling resistance of each of the at least one machines includes:
   calculating a total effective grade associated with the machine based on the drive axle torque;
   estimating an actual grade associated with the at least one machine based on the GPS data; and
   calculating the rolling resistance of each of the at least one machine based on the total effective grade and actual grade associated with the at least one machine.

6. The system of claim 1, where the performance simulator is further configured to estimate a cost associated with implementing the proposed modification based on historical haul route data.

7. The system of claim 6, wherein outputting results of the simulated performance includes generating a haul route modification report that summarizes one or more of the proposed modification, results of the simulated performance, and the estimated costs associated with implementing the proposed modifications.

8. The system of claim 1, wherein the proposed modification includes adjusting an actual grade associated with the irregular portion of the haul route.

9. The system of claim 1, wherein the proposed modification includes modifying a surface composition associated with the irregular portion of the haul route.

10. The system of claim 1, wherein the proposed modification includes modifying a surface density associated with the irregular portion of the haul route.

11. The system of claim 1, wherein the torque estimator is further configured to estimate an efficiency loss of the machine.

12. The system of claim 11, wherein the efficiency loss is estimated as the difference between input power and output power efficiency ratings of the machine.

* * * * *